United States Patent
Olson et al.

(10) Patent No.: US 6,169,928 B1
(45) Date of Patent: Jan. 2, 2001

(54) APPARATUS AND METHOD FOR SHARING DATA AMONG A PLURALITY OF CONTROL DEVICES ON A COMMUNICATIONS NETWORK

(75) Inventors: Ronald Wayne Olson; Anthony Joseph Cinalli, both of Charlottesville; Andrew Edward Spencer, Roanoke, all of VA (US)

(73) Assignee: GE Fanuc Automation North America, Inc.

( * ) Notice: Under 35 U.S.C. 154(b), the term of this patent shall be extended for 0 days.

(21) Appl. No.: 09/109,245

(22) Filed: Jun. 30, 1998

(51) Int. Cl.[7] .................................................. G05B 19/18
(52) U.S. Cl. .............................................................. 700/7
(58) Field of Search ................................. 700/1, 2, 7–10, 700/20

(56) References Cited

U.S. PATENT DOCUMENTS

| | | |
|---|---|---|
| Re. 036,263 * | 8/1999 | Janke et al. ............................. 700/5 |
| 4,771,286 | 9/1988 | Niessen et al. . |
| 4,831,620 | 5/1989 | Conway et al. . |
| 4,969,083 | 11/1990 | Gates . |
| 5,072,374 * | 12/1991 | Sexton et al. ......................... 700/2 X |
| 5,159,673 | 10/1992 | Sackmann et al. . |
| 5,245,704 * | 9/1993 | Weber et al. ......................... 700/7 X |
| 5,387,769 | 2/1995 | Kupersmith et al. . |
| 5,428,555 | 6/1995 | Starkey et al. . |
| 5,457,681 | 10/1995 | Gaddis et al. . |
| 5,553,071 | 9/1996 | Aranguren et al. . |
| 5,583,997 | 12/1996 | Hart . |
| 5,608,786 | 3/1997 | Gordon . |
| 5,617,421 | 4/1997 | Chin et al. . |
| 5,636,216 | 6/1997 | Fox et al. . |
| 6,061,603 * | 5/2000 | Papadopoulos et al. ............. 700/9 X |

\* cited by examiner

*Primary Examiner*—Thomas M. Heckler

(57) ABSTRACT

A networked system is provided for connecting a plurality of programmable logic controllers together in a manner which more efficiently uses available network bandwidth. The network includes a producer controller and at least one consumer controller. The producer controller shares a portion of its internal memory with other consumer controllers on the network. In this manner, a data sample is sent from the producer controller to one or more consumer controllers. The consumer controllers check to determine if data samples are lost during transmission over the network and initiate responsive corrective action.

10 Claims, 2 Drawing Sheets

APPARATUS AND METHOD FOR SHARING DATA AMONG A PLURALITY OF CONTROL DEVICES ON A COMMUNICATIONS NETWORK

BACKGROUND OF THE INVENTION

This invention relates in general to control devices and, more particularly, to the sharing of data among a plurality of control devices such as programmable logic controllers.

Programmable logic controllers (PLC's) are a relatively recent development in industrial and process control technology. As a part of this control technology, a PLC is used to monitor input signals from a variety of sources which report events and conditions occurring in a controlled process. For example, a PLC can monitor such input conditions as motor speed, temperature, pressure, volumetric flow and the like. A PLC can also include input circuits which enable it to monitor whether input devices are on or off. A control program is stored in a memory within the PLC to instruct the PLC what actions to take upon encountering particular input signals or conditions which are provided to input points of the PLC. In response to these input signals provided by input sensors, the PLC derives and generates output signals which are transmitted via PLC output points to various output devices to control the process. For example, the PLC issues output signals to speed up or slow down a conveyer, rotate the arm of a robot, open or close a relay, raise or lower temperature as well as many other possible control functions too numerous to list. As will be apparent, a PLC is a specific type of control device and performs functions similar to other types of control devices such as microcomputer based drive controllers for motor drive applications, e.g., multiple motor drive systems for paper mills and steel mills. For purpose of this description, reference to "controller" or to "PLC" in each instance is intended to include both the specific PLC and the general class of microprocessor based controllers.

It is often desirable for control systems to share data among a plurality of individual controllers such as the programmable logic controllers. However, in many cases, a given set of data is needed by some but not all controllers in a networked system. Several different approaches have been developed to address this situation. For example, in one approach, all data is sent to all devices and any unneeded data is discarded by protocol software or applications software. Another approach is to send an explicit copy of each set of data to each device needing that data. Unfortunately, this results in multiple copies of the shared data being sent over the connecting network. Yet another approach is to build a highly specialized network using specialized hardware which can be configured to accept only data of interest.

In conventional data sharing arrangements, an "acknowledgment" or "ack-back" approach is used to take care of the situation where data is lost in transmission over the network. The sending device transmits data to a receiving device at a specific address on the network. When the receiving device receives the data, it transmits an "acknowledgment" back to the sending device which resides at another particular address. If the sending device fails to receive an "acknowledgment" within a predetermined time period, the sending device retransmits the data to the receiving device. Unfortunately, this approach requires the transmission of overhead data in addition to the control data. The overhead data undesirably consumes bandwidth on the network as well as in the sending and receiving devices even when no retransmission of the data is required.

SUMMARY OF THE INVENTION

Accordingly, one object of the present invention is to provide an apparatus for efficiently sharing data among multiple control devices without the requirement of specialized hardware.

Another object of the present invention is to provide an apparatus for efficiently sharing data among multiple control devices without the requirement of extensive protocol processing within the devices sharing the data.

Yet another object of the invention is to provide an apparatus for sharing data among control devices which reduces error correction overhead by configuring each control device to rely on its knowledge of when data should arrive and to take corrective action when such data fails to arrive.

In accordance with one embodiment of the present invention, a system of programmable logic controllers is provided wherein the controllers communicate with each other and share data with each other under a predetermined communications protocol. More specifically, the plurality of programmable logic controllers includes one or more producer controller and one or more consumer controllers. The system further includes a communications network connecting the producer controller to the consumer controller. A given producer controller takes a data sample and transmits the data sample to the consumer controllers on the network. The consumer controller checks for loss of data samples transmitted from the producer controller to the consumer controller.

It is noted that the disclosed system provides high reliability by placing the responsibility of checking for lost data on the consumer device as opposed to the conventional technique of having each data producer check for a data acknowledgment back from a consumer device.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
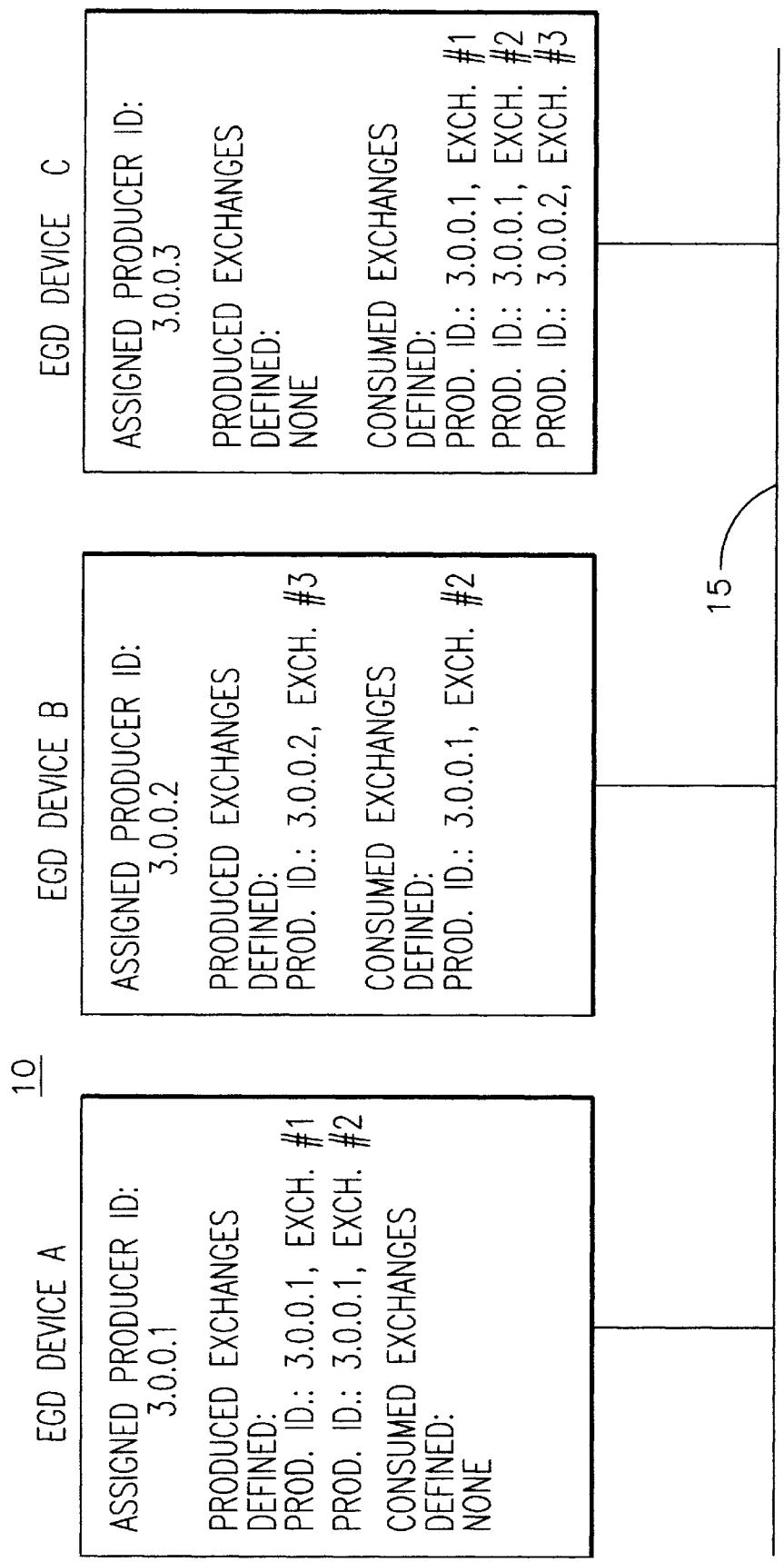
FIG. 1 is a block diagram of one embodiment of the disclosed apparatus for data sharing among multiple control devices.

FIG. 1 is a block diagram depicting a representative embodiment of the disclosed apparatus for sharing data among a plurality of control devices. More specifically, FIG. 1 shows a system 10 including control devices A, B and C which are coupled together via network 15. In this particular embodiment, an Ethernet LAN with internet protocols are employed on the network. The disclosed system is conveniently referred to as an Ethernet global data (EGD) system while it should be understood that communications networking protocols other than Ethernet may be employed as well. The disclosed EGD system provides a communications mechanism wherein one control device, referred to as a producer device, shares a portion of its internal memory with one or more other control devices, referred to as consumer devices, at a regularly scheduled periodic rate. More particularly, a snapshot of the producer device's internal memory is taken and transmitted over network 15 to one or more other devices. This snapshot information is referred to as an exchange and includes a data sample taken by the producer device. More particularly, an "exchange" is the defined data, address, and other identifiers. As used herein, an "exchange definition" is synonymous with "exchange" and an "exchange sample" is a given transmission of an exchange. This exchange is uniquely distinguished by a set of identifiers, namely the PRODUCER ID and the EXCHANGE ID. The PRODUCER ID is assigned to uniquely identify the particular Ethernet global data device on network 15 or associated networks coupled to network 15. The above-mentioned EXCHANGE ID refers to a value which identifies a specific exchange definition for the particular producing device.

For example, FIG. 1 depicts representative PRODUCER ID's and EXCHANGE ID's. More particularly, FIG. 1 shows an EGD device A which produces two exchanges and which consumes or receives no exchanges. The assigned PRODUCER ID's of EGD devices A, B and C are depicted below in Table 1, where the numbers are selected merely to show a format and are not representative of a real or valid set of internet protocol addresses.

TABLE 1

| DEVICE | PRODUCER ID |
|---|---|
| A | 3.0.0.1 |
| B | 3.0.0.2 |
| C | 3.0.0.3 |

EGD device A produces two exchanges which are defined as PROD ID: 3.0.0.1, EXCH #1. and PROD ID: 3.0.0.1; EXCH #2. EGD device B produces the exchange defined as PROD ID: 3.0.0.2; EXCH #3 and consumes the exchange defined as PROD ID: 3.0.0.1; EXCH #2. EGD device C produces no exchanges and consumes the exchanges defined as PROD ID: 3.0.0.1; EXCH #1. PROD ID: 3.0.0.1; EXCH #2 and PROD ID: 3.0.0.2; EXCH #3. Thus, EXCH #2 is produced by EGD device A and is consumed by multiple devices, namely EGD devices B and C.

It is noted that in this particular embodiment, a particular exchange definition can be actively produced by only one EGD device; however, an exchange definition can be simultaneously consumed by multiple EGD devices. Moreover, a given EGD device can simultaneously produce and consume exchanges. Also in this embodiment, IP addresses are employed as PRODUCER ID's.

Figure 2:
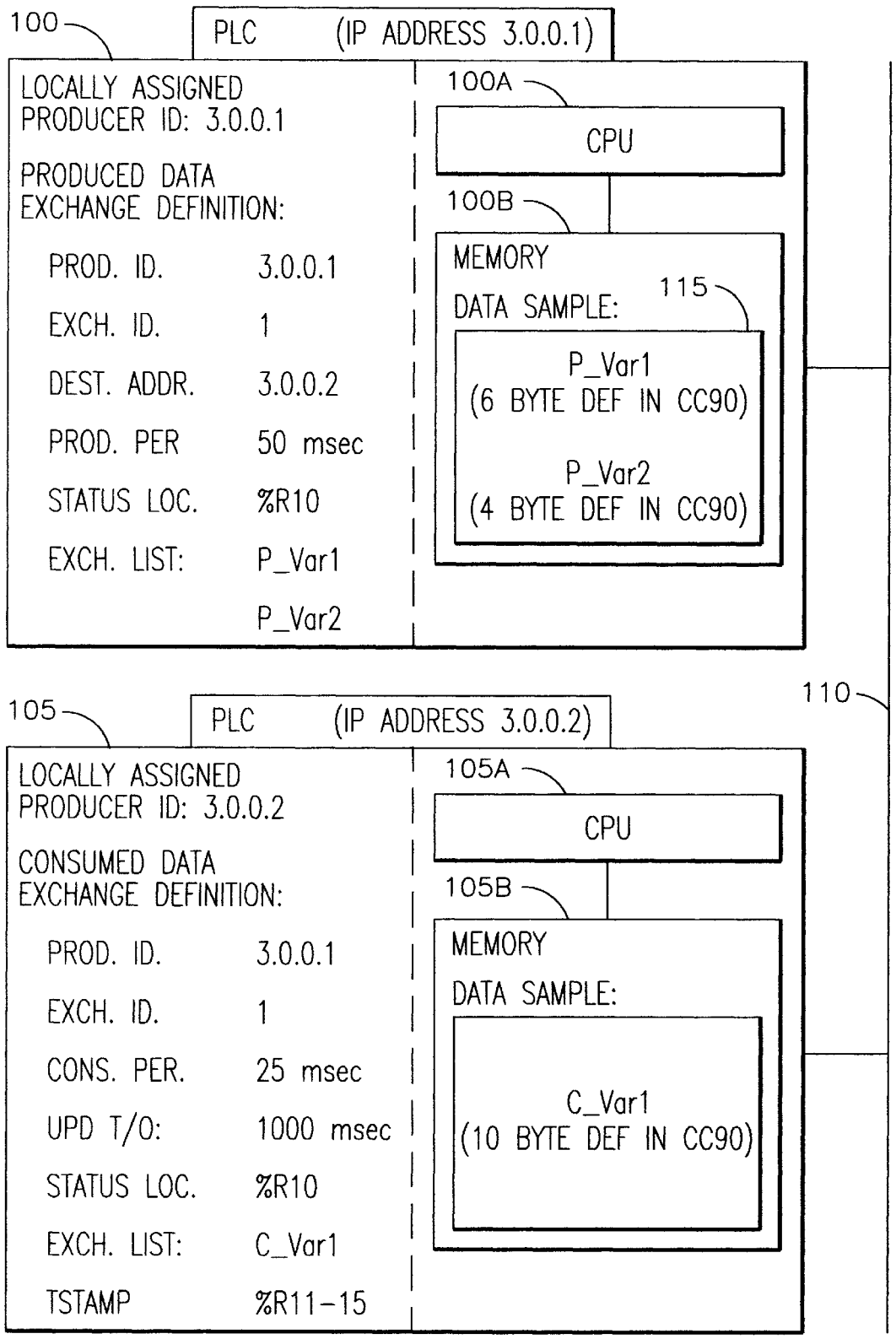
FIG. 2 is a schematic diagram of the disclosed network including a plurality of control devices and showing a representative producer device and a representative consumer device.

FIG. 2 shows two programmable logic controllers, namely PLC's 100 and 105 which are coupled together by a network 110. In this particular example, PLC 100 acts as a producer device and PLC 105 acts as a consumer device during a representative data exchange. PLC 100 includes a CPU 100A which is coupled to a memory 100B. PLC 105 includes a CPU 105A which is coupled to a memory 105B. Two controllers which are suitable for use as controllers 100 and 105 are the GE FANUC Series 90–70 PLC and the GE ICS Innovation Series Controller.

A representative data exchange sample taken by PLC 100 and to be transmitted over network 110 is shown in PLC 100 as data sample 115. Data sample 115 is taken from the I/O points of PLC 100 during an I/O scan and is shown as being stored in memory 100B. In this example, PLC 100 is a producer device or producer PLC. PLC 100 transmits the data sample information stored in memory locations defined for the variables P_Var1 (6 bytes) and P_Var2 (4 bytes). PLC 105 receives the transmitted data sample information and stores this information in the memory location defined for the variable C_Var1 (10 bytes). In other words, PLC 100 repeatedly sends a portion of its internal memory, namely the data sample, on the network to consumer PLC 105 as an exchange.

The "produced data exchange definition" of the producer PLC 100 includes PROD. ID, EXCH. ID., DEST ADDR., PROD. PER, and EXCH LIST information which is discussed below.

The "consumed data exchange definition" of the consumer PLC 105 includes PROD. ID, EXCH. ID., CONS. PER, EXCH LIST and TSTAMP information which is also discussed below.

The production of a data sample onto network 110 occurs at the produced period (PROD PER). The produced period is independent of the time the data sample is actually updated from producer CPU 100A. The producer CPU attempts to update the data sample at the production period (PROD PER) interval; however, delivery is not guaranteed at that time since delivery is delayed by the sweep time during which the I/O points are scanned. The first update of the data sample from producer CPU 100A occurs at the end of the first scan. The first production of data onto network 110 occurs one production period after the CPU transitions to the I/O enabled state.

In a similar manner, consumer CPU 105A in consumer PLC 105 scans the data at the consumed period (CONS. PER) independent of when data is updated from network 110. The data is updated at consumer CPU 105A upon arrival of the data sample from network 110. The data in CPU memory 105B is not updated until the data sample has been received from network 110.

When exchanging data samples, producer and consumer devices operate asynchronously. In the disclosed system, an exchange definition is stored in all devices which are consumers of that exchange and in the producer device itself. The exchange definitions for produced data and consumed data exhibit similarities and differences which are discussed subsequently.

Returning again to FIG. 2, it is seen that producer PLC device 100 produces 10 bytes of data every 50 msec. In other words, the data sample in memory 105A contains a variable P_Var1 having a length of 6 bytes and another variable P_Var2 having a length of 4 bytes. The data sample is thus 10 bytes in length total. The production period (PROD. PER.) is 50 msec such that the data sample is produced every 50 msec. The producer ID (PROD. ID) for this exchange is 3.0.0.1 and the exchange ID (EXCH. ID.) for this particular exchange is 1. The EXCH. ID is a unique number that identifies a particular variable or group of variables to be transferred from the producer device to the consumer device. Producer and consumer devices operate completely asynchronously from each other. Thus, for each device, both the data that the device produces and the data that the device consumes are separately defined.

The exchange is provided by the producer device to network 110 for transmission to the consumer device or devices. In this particular example, PLC device 105 is the consumer device and as such scans for new data every 25 msec. Consumer PLC device 105 will declare a refresh error if data is not received within a preselected time, such as, for example, 1 second from initiation of the scan.

An IP address is assigned to producer PLC 100 and is used as the producer ID (PROD. ID.) of PLC 100. As seen in FIG.

2, the producer ID 3.0.0.1 is locally assigned to be the producer ID of producer PLC 100. It will be recalled that the producer ID (PROD. ID.) is used to uniquely identify the EGD device (here a PLC) on the network.

In the disclosed system, in order for a consumer device to accept a data sample from a producer device, the PROD. ID and the EXCH. ID within the received sample must match that which is expected by the consumer. More specifically, the PROD ID's and the EXCH. ID's of the produced data exchange definition and the consumed data exchange definition must match as they do in the example seen in FIG. 2.

In producer PLC 100, the PROD. ID of the "produced data exchange definition" is the IP address of the consumer PLC. In this particular example, this destination address is 3.0.0.1. The exchange ID is 1. It is thus seen that the PROD. ID and EXCH. ID of the produced data exchange definition of PLC 100 respectively match the PROD. ID and EXCH. ID of the consumed data exchange definition of PLC 105.

In producer PLC 100 of FIG. 2, the destination address (DEST. ADDR.) specified in the "produced data exchange definition" is the IP address of the consumer PLC 105, namely 3.0.0.2 in this case. The destination address value can identify all nodes (Broadcast), a group of nodes (Multicast), or a single node (Unicast). This feature advantageously permits more efficient bandwidth usage in PLC systems where shared data among multiple devices on the network is required.

The produced period (PROD. PER) of the produced data exchange definition of producer PLC 100 is set to 50 msec in this particular example as seen in FIG. 2. Producer PLC 100 will thus produce or send data onto network 110 at this interval. Moreover, CPU 100A of producer PLC 100 will attempt to update the data sample with actual values from memory 100B at this interval. However, it should be noted that if CPU 100A is executing logic when the interval expires, the update will be delayed until execution of the logic is complete. For this reason, it is possible that the User Data portion of a sample produced on the network may be a duplicate of the User Data portion of the previous sample.

In a particular PLC embodiment, status information may be part of the exchange definition and will be discussed later in more detail. It is noted now however that a status value (STATUS LOC, % R10 in this example) is level triggered and will remain set for an entire period (namely a producer period for producer PLC's and a consumed period for consumer PLC's). It is possible in a consumer PLC to always have the status value set to 1. This implies that there is always new data each time the sample is scanned by the CPU.

In FIG. 2 it is seen that the exchange variable lists (EXCH. LIST) for both the produced data exchange definition and the produced data exchange definition can contain a mixture of various data elements. In this example, the EXCH. LIST for producer PLC 100 includes the variables P_Var1 and P_Var2 while the EXCH. LIST for consumer PLC 105 includes the variable C-Var1.

As observed in FIG. 2, the consumed period (CONS PER) of consumer PLC 105 in the illustrative example is set to 25 msec. Thus, CPU 105A of PLC 105 will attempt to scan the data sample and/or retrieve status updates for that PLC at a CONS PER periodic interval of 25 msec. However, if CPU 105A is executing logic when the CONS PER interval expires, then the update of the data sample is delayed until completion of logic execution by the CPU.

The update timeout (UPD T/O) of consumer PLC 105 is set to 1000 msec, namely 1 sec. Consumer PLC 105 will set a Status Error to signal a refresh error if data is not received by PLC 105 within this UPD T/O time period. The UPD T/O period should be set to at least double the producer Produced Period to allow for network delays. This UPD T/O value of the consumer PLC effectively defines how fast the consumer PLC should declare that the producer PLC has stopped producing.

The consumer data exchange definition also includes a time stamp TSTAMP of the data sample. The TSTAMP value is used to verify that the data received is a new sample rather than an old sample which was previously received and which is now received again due to delays in the system. In more detail, it is noted that each EGD exchange contains a time stamp that pinpoints when the associated data sample was transferred from the producing PLC's CPU to its Ethernet interface for transmission over the network. The time stamp value is based on a built-in clock in the Ethernet interface. It sends this value to the PLC CPU which uses it to time stamp its data exchanges.

The above described EGD system allows multiple EGD consumers to consume data produced by one producer EGD device on the network. This feature advantageously permits more efficient bandwidth usage in PLC systems where shared data among multiple devices on the network is required. In this particular embodiment, this EGD system supports the use of 32 separate groups of controllers. Each one of these groups includes a multicast IP address which is assigned thereto.

In more detail, the "produced data exchange definition" of the producer PLC 100 also includes a NET ADDRESS NAME, CONSUMER TYPE, SEND TYPE (not shown in FIG. 2). The NET ADDRESS NAME of this exchange definition is the name assigned to a network adapter (not shown) within the PLC that is producing the exchange, namely PLC 100 is this example. The CONSUMER TYPE specifies how the consuming device will be identified (i.e. by name, IP address, or group ID). For this example, the consuming PLC is identified by its local producer IP address. The SEND TYPE defines when the exchange will be transmitted. In this particular example, this field is fixed at "always".

The "consumed data exchange definition" of the producer PLC 105 also includes a GROUP ID (not shown in FIG. 2) which is used when more than one device is consuming the same exchanges from one producer device. Value 0 means that only one device is consuming the information.

As mentioned earlier, the "produced data exchange definition" includes a STATUS WORD, also referred to as an EGD status word. The STATUS LOC is a variable name for a status memory location where the STATUS WORD is located. The STATUS WORD signifies when an error has occurred. The "consumed data exchange definition" also includes a STATUS WORD. Again, the STATUS LOC is a variable name for a status memory location, % R10, where the STATUS WORD is located. The STATUS WORD here again signifies when an error has occurred.

An EGD status word allows an EGD consumer device to obtain the operating status of a given exchange definition. Produced status words and consumed status words are given below in the status charts of Table 2 and Table 3, respectively:

TABLE 2

PRODUCED STATUS WORDS

| STATUS VALUE | DESCRIPTION |
| --- | --- |
| 0 | no new status has occurred |
| 1 | no error currently exists |
| 4 | specification error |
| 10 | IP layer not currently initialized |

TABLE 3

CONSUMED STATUS WORDS

| STATUS VALUE | DESCRIPTION |
| --- | --- |
| 0 | no new status event has occurred |
| 1 | data consumed |
| 3 | SNTP error |
| 4 | specification error |
| 6 | data refresh error |

With respect to STATUS VALUE 3 (SNTP ERROR), it is noted that the PLC includes an Ethernet interface to the network. The Ethernet interface of the PLC which is producing the exchange is configured for network time synchronization (Network Time Sync parameter is set to SNTP), but is not synchronized to an SNTP server. Thus, the time stamp associated with this data is not synchronized to the network. This represent a minor error condition.

It is noted that the EGD status word is only changed upon the expiration of the producer period (PROD PER) for produced exchanges and the expiration of the consumer period (CONS PER) for consumer devices. As mentioned earlier, it should be understood that if the expiration of the respective period occurs during a logic sweep, then the update to the data sample is delayed until the end of that sweep. The status word values remains set for the entire period. In other words, the status word is not pulsed or set for a specific number of PLC sweeps.

It is possible that the status word is always set to 1 which means that at the time of period expiration, new data had arrived or was successfully produced. If a consumer device should desire some kind of notice that the data transfer occurred, then the value of the status word can be cleared to 0 once a non-zero event is seen.

The first update of the status word depends on the type of data exchange. For example, produced exchange status words are updated at the end of the first logic sweep. Thus, the values of the status word can be ignored without consequences during the first scan. In contrast, consumed exchange status words are updated at the beginning of the first logic sweep. Thus, this status word value is valid immediately when the CPU of the consumer PLC transitions from stop to run. In the particular example of FIG. 2, the status word is stored at a location STATUS LOC of R % 10.

It is noted that the disclosed EGD system provides high reliability by placing the responsibility of checking for lost data on the consumer device as opposed to the conventional technique of having each data producer check for data acknowledgment back from a consumer device. More specifically, for a given produced data exchange, each consumer device exhibits its own timeliness requirements. In other words, one consumer device may need a data sample update with one time period and another consumer device may need a data sample update within another time period. The disclosed EGD system permits the monitored time period to vary for the different consumer device of a given exchange type. The time period for each consumer device is established in the configuration process for that particular consumer device. If the consumer device does not receive during the configured time period, the consumer device treats the lack of data as a fault. In other words, each consumer device, upon detecting lack of fresh data within that time period, appropriately reports a fault according to the conventional fault reporting mechanism for that particular device. It is emphasized that no acknowledgment need be reported back from the consumer device to the producer device. This significantly improves Ethernet bus utilization in comparison with the conventional approach which employs specific acknowledgments, or ack-backs. Note that if data is received during a time period, the consumer device resets the time period to look for the next data.

It is noted that each Exchange type is identified by a three-tiered identifier. This identifier includes 1) the earlier discussed producer ID (PROD ID—a number unique to that producer device) 2) an exchange ID (EXCH ID—a number identifying which of several exchanges from that producer is being sent), and 3) a configuration signature (identifies the vintage of the exchange format). A consumer device matches these three numbers to insure that it is accepting only the exchanges of interest, and to determine that the exchange is of the correct version or vintage.

In other words, before accepting a data sample in an exchange from the network as being valid, the consumer device matches the PROD ID, EXCH ID and CONFIG SIG of the consumed data exchange definition with the PROD ID, EXCH ID and CONFIG SIG of the produced data exchange definition. If there is no match, the data sample is not regarded by the consumer PLC as being valid. However, if there is a match, then the data sample is valid to the consumer PLC.

While an advanced programmable logic controller system for efficiently sharing data among a plurality of programmable logic controllers is described above, it is clear that a method of communicating among a plurality of programmable logic controllers under a predetermined communications protocol is also disclosed. In the disclosed method, the plurality of programmable logic controllers includes a producer controller and at least one consumer controller. The method includes the steps of networking the plurality of programmable logic controllers together and sampling data by the producer controller to generate a data sample. The method also includes the step of transmitting by the producer controller of the data sample over the network to the consumer controller. The method further includes the step of checking by the consumer controller for loss of the data sample.

The disclosed apparatus and method advantageously efficiently provides the sharing of data among multiple control devices without the requirement of specialized hardware. This is desirably accomplished without the requirement of extensive protocol processing within the devices sharing the data. Error correction overhead is reduced by configuring each control device to rely on its knowledge of when data should arrive and to take corrective action when such data fails to arrive.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A system of programmable logic controllers communicating with each other under a predetermined communications protocol, the system comprising:

a plurality of programmable logic controllers including a producer controller and at least one consumer controller; and a communications network connecting the producer controller to the consumer controller, the producer controller taking a data sample and transmitting the data sample to the consumer controller over the network, the consumer controller checking for loss of data samples transmitted from the producer controller to the consumer controller.

2. The system of claim 1 wherein the producer controller generates a multiple field produced data exchange definition including at least a producer ID, an exchange ID and a destination address.

3. The system of claim 2 wherein the consumer controller includes a multiple field consumed data exchange definition including at least a producer ID and an exchange ID.

4. The system of claim 3 wherein the consumer controller accepts a received data sample if the producer ID and exchange ID of the received data sample match the producer ID and exchange ID expected by the consumer controller.

5. The system of claim 1 wherein the communications network is an Ethernet LAN with internet protocol.

6. A method of communicating among a plurality of programmable logic controllers under a predetermined communications protocol, the plurality of programmable logic controllers including a producer controller and at least one consumer controller, the method comprising:

networking the plurality of programmable logic controllers together;

sampling data by the producer controller to generate a data sample;

transmitting by the producer controller of the data sample over the network to the at least one consumer controller; and checking by the at least one consumer controller for loss of the data sample.

7. The method of claim 6 further comprising the step of generating by the producer controller a multiple field produced data exchange definition including at least a producer ID, an exchange ID and a destination address.

8. The method of claim 7 further comprising the step of storing in the consumer controller a multiple field consumed data exchange definition including at least a producer ID and an exchange ID.

9. The method of claim 8 further comprising the step of the consumer controller accepting a received data sample if the producer ID and exchange ID of the received data sample match the producer ID and exchange ID expected by the consumer controller.

10. The method of claim 6 wherein the communications network is an Ethernet LAN with internet protocol.

* * * * *